United States Patent
Langeslag et al.

(10) Patent No.: US 7,202,609 B2
(45) Date of Patent: Apr. 10, 2007

(54) NOISE REDUCTION IN A POWER CONVERTER

(75) Inventors: Wilhelmus Hinderikus Maria Langeslag, Nijmegen (NL); Joan Wichard Strijker, Nijmegen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/504,140

(22) PCT Filed: Jan. 27, 2003

(86) PCT No.: PCT/IB03/00227

§ 371 (c)(1),
(2), (4) Date: Aug. 10, 2004

(87) PCT Pub. No.: WO03/069767

PCT Pub. Date: Aug. 21, 2003

(65) Prior Publication Data

US 2005/0122056 A1   Jun. 9, 2005

(30) Foreign Application Priority Data

Feb. 14, 2002   (EP) .................................. 02075608

(51) Int. Cl.
*H05B 41/36* (2006.01)

(52) U.S. Cl. .................. 315/291; 315/209 R; 315/244; 315/276

(58) Field of Classification Search ............ 315/209 R, 315/291, 244, 276, 307; 363/39–42; 323/282–287
See application file for complete search history.

(56) References Cited

U.S. PATENT DOCUMENTS

| 5,500,575 | A | * | 3/1996 | Ionescu ........................ 315/307 |
| 6,011,361 | A | | 1/2000 | Blankers ...................... 315/307 |
| 6,204,649 | B1 | * | 3/2001 | Roman ........................ 323/282 |
| 6,211,625 | B1 | * | 4/2001 | Nilssen ........................ 315/225 |
| 6,212,079 | B1 | * | 4/2001 | Balakrishnan et al. ....... 323/284 |
| 6,469,917 | B1 | * | 10/2002 | Ben-Yaakov .................. 363/44 |
| 6,480,401 | B2 | * | 11/2002 | Tang ........................ 363/21.02 |
| 6,525,514 | B1 | * | 2/2003 | Balakrishnan et al. ....... 323/283 |
| 6,844,710 | B2 | * | 1/2005 | Lipcsei et al. ............... 323/284 |

OTHER PUBLICATIONS

Kleuskens et al., 75W SMPS with TEA 1507 Quasi-Resonant Flyback controller, Philips Semiconductor Jun. 30, 2000.*

* cited by examiner

*Primary Examiner*—Tuyet Vo
*Assistant Examiner*—Ephrem Alemu
(74) *Attorney, Agent, or Firm*—Peter Zawilski

(57) ABSTRACT

A power converter includes a control device (28) for a switching power converter (10), a switching power converter and a method of controlling a switch in a power converter for reducing audible noise. The power converter includes the control device (28) and at least one switch (26) for regulating the power conversion. The control device (28) includes a timer (45) for monitoring a switching frequency of the switch (26) to indicate when the frequency has dropped to a certain level, and a gate driving circuit (32) connected to the timer and arranged to regulate the switching of the switch in dependence of the indication from the timer, so that the frequency rises above the certain level in order to reduce generation of audible noise.

10 Claims, 5 Drawing Sheets

NOISE REDUCTION IN A POWER CONVERTER

TECHNICAL FIELD

The present invention relates to a control device for reducing audible noise, a power converter including such a control device as well as to a method of controlling a power converter, such as in a quasi-resonant switched mode power converter for use in TVs, VCRs, printers, computers etc.

BACKGROUND OF THE INVENTION

In many switched mode power converters the minimal frequency is not limited below 20 kHz, like for instance in quasi-resonant converters. This means that the converter can generate audible noise, which is not acceptable and which can be perceived by the human ear. In some converters like fly-back converters this can happen when the converter is short-circuited, at start up or when turning off the converter. When a quasi-resonant power converter is driven at high power levels, the frequency with which the converter is switched gets lower. The switching frequency is furthermore lowered when the current through the switch gets high, which switch is normally realized with some kind of transistor circuit, like a FET transistor. There thus exists a problem with the converters of today.

U.S. Pat. No. 6,011,361 describes a buck converter for igniting and operating a high-pressure discharge lamp. Here the maximum off time of the transistor switching the converter can be set preventing operations below 20 kHz. In this document there is no monitoring or direct limitation of the frequency, only limitations for the off time are set. These limitations are set all the time irrespective of if the switching frequency is high or low. The off time gets an upper limit of 36 µs and a lower limit of 5 µs. With regard to audible noise, the switch is turned on if a time limit for the off time is reached. In order for this device to work for reducing audible noise, the load and the input voltage have to be known. Since the circuit is arranged for driving a lamp, which load is known, this works well in this environment. It would however not work properly for a power supply for reducing audible noise, because a power supply has to be able to work with several different types of loads and limitation of the switching period is only to be made when the frequency is actually low and not when the converter is working normally. The document does also not describe limiting of the peak current in the transistor in a discontinuous conduction mode.

SUMMARY OF THE INVENTION

The present invention is directed towards the problem of reducing audible noise in power converters, which can for example be present at start up, short circuit, overpower or when turning off a converter. The invention is defined by the independent claims. The dependent claims define advantageous embodiments.

The problem is solved by a method of controlling a power converter comprising at least one switch, where the switching frequency of the first switch is monitored and the first switch is controlled so that the frequency stays above a certain level generating audible noise.

With a preferred embodiment of the present invention there is realized a converter which requires few extra components in the control device, which thereby keeps the cost of the control device and converter low. Additional benefits of the invention will be evident from the following description

DETAILED DESCRIPTION OF THE INVENTION

The present invention will in the following be described in relation to fly-back converters for DC/DC conversion. The invention is however in no way limited to such converters or only to DC/DC conversion, but can be implemented in any type of converter.

Like for example buck, boost or buck-boost. Conversion can likewise be other types of conversion like AC/DC, DC/AC or AC/AC.

Figure 1:
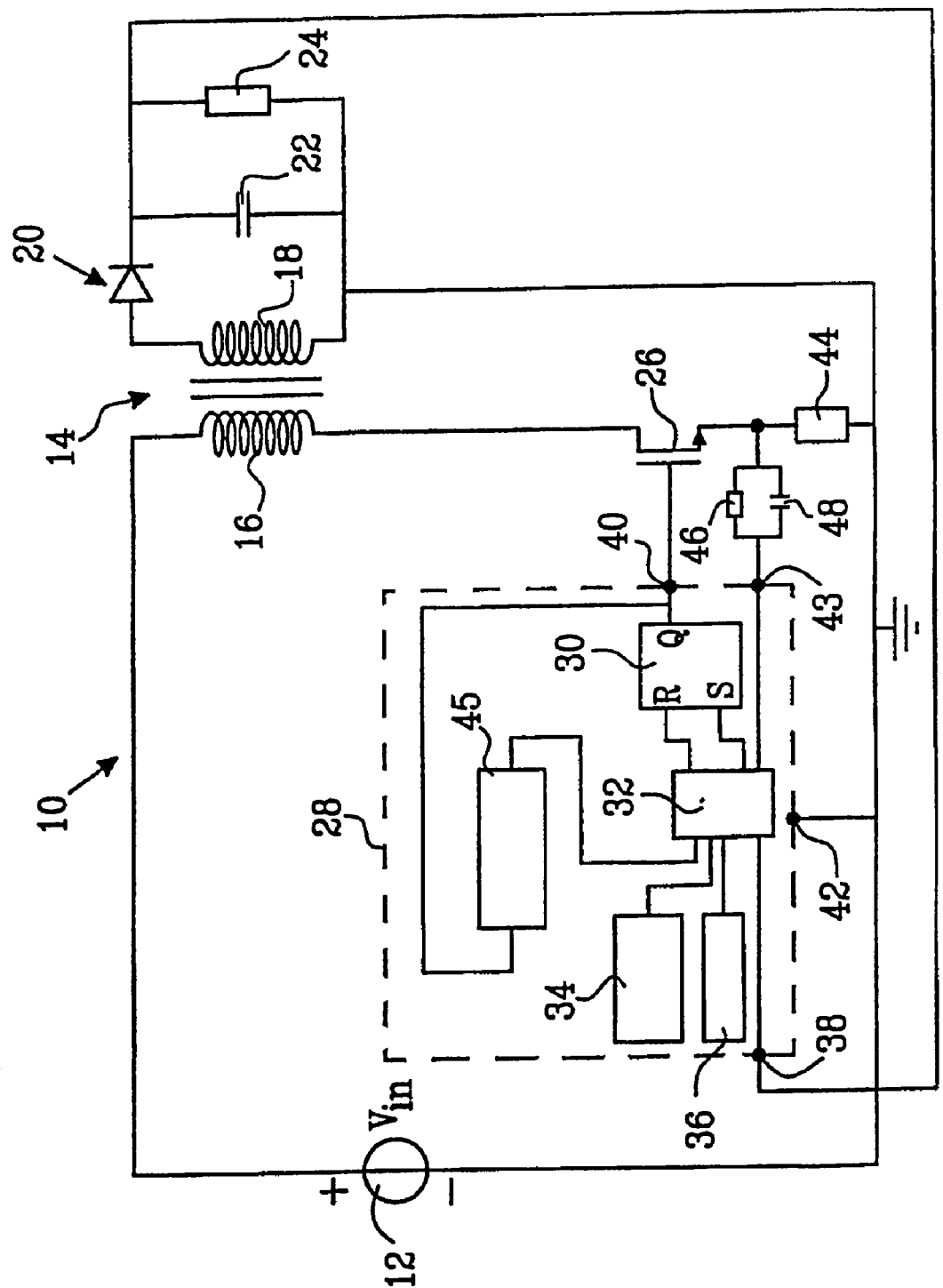
FIG. 1 is a schematic diagram of a fly-back converter according to a preferred embodiment of the invention.

FIG. 1 shows a fly-back converter 10 according to the invention working as a power supply. The shown converter is a converter where current mode control is used. In this converter there is an input voltage source 12 having a voltage $V_{IN}$, connected between ground and a first end of a primary winding 16 of a power conversion means in the form of a transformer 14. The second end of the primary winding 16 is connected to the drain of a first transistor or first switch 26, which transistor is preferably a FET transistor. The gate of the first transistor 26 is connected to a driver output 40 of a control device or controller 28. The source of the transistor 26 is connected to a sense resistor 44, which in turn is connected to ground. The connection point between the source of the transistor 26 and the sense resistor 44 is connected to a sense input 43 of the controller 28 via a parallel circuit comprising a resistor 46 and a capacitor 48. The controller 28 has a grounding terminal 42 connected to ground for grounding the different circuits making up the controller. The controller 28 includes a power-on-reset circuit 34 and an oscillator 36, both connected to a PWM controller or gate driving circuit 32. The gate driving circuit 32 is also connected to a control input 38 and the sense input 43. The gate driving circuit 32 is furthermore connected to a reset input R of a RS flip-flop 30 and to a set input S of the RS flip-flop 30. The RS flip-flop has an output Q connected to the gate of the transistor 26. The controller 28 has a timer 45 connected between the driver output 40 and the gate driving circuit 32.

A first end of a secondary winding 18 of the transformer 14 is connected to a diode 20, which in turn is connected to a first capacitor 22 and a load 24. The load 24, first capacitor 22 and second winding 18 of the transformer 14 are also connected to ground, preferably via galvanic isolation. A connection point between the diode 20, the capacitor 22 and the load 24 is also connected to the control input 38 of the controller 28. The connection point is preferably connected to the control input 38 via an optocoupler.

Figure 2:
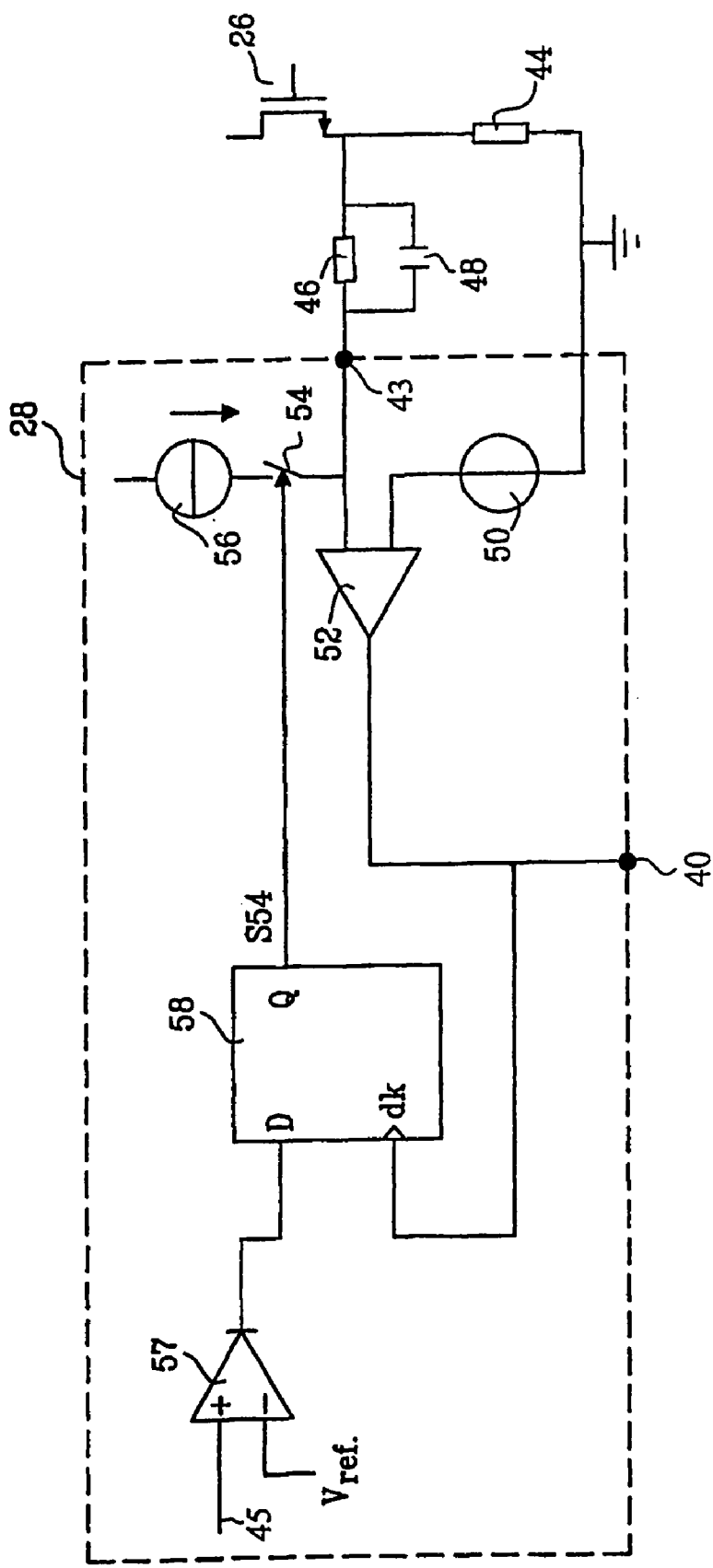
FIG. 2 shows the controller of a fly-back converter according to the preferred embodiment of the invention.

FIG. 2 shows an electric circuit diagram of parts of the controller 28 according to a preferred embodiment of the present invention. The sense input 43 of the controller 28 is connected to a first input of a comparing device in the form of a first comparator 52, which first comparator is provided in the gate driving circuit 32. A current source 56 is connected to said first input of the comparator 52 via a second switch 54. A second input of the comparator 52 is connected to a voltage source 50. The output of the first comparator 52, which output is connected to the transistor 26 which forms a first switch, is also connected to a clock input dk of a D flip-flop 58. A second comparator 57 has an output connected to a D input of the D flip-flop 58. The second comparator 57 has a positive input terminal, which receives a signal from the previously mentioned timer, and a negative input terminal, which is connected to a reference voltage $V_{ref}$. The second switch 54 is controlled by the gate driving circuit 32 in a way, which will be described later on in this description. It is also understood that the second switch, the current source, the voltage source, the D flip-flop and the second comparator are also provided in the gate driving circuit.

Figure 3:
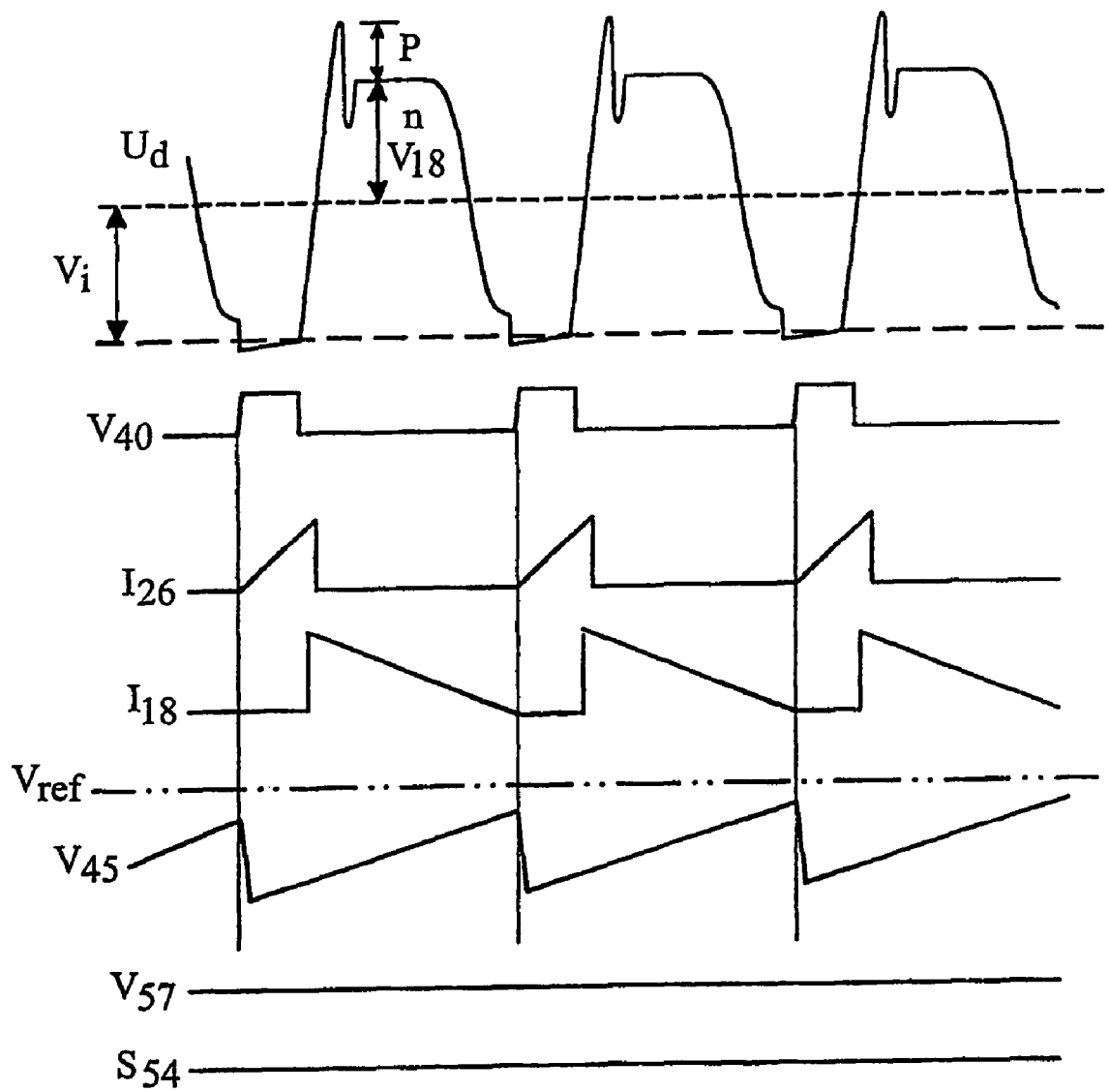
FIG. 3 is a graph showing various currents and voltages during a few cycles of operation of the converter of FIG. 1.
Figure 4:
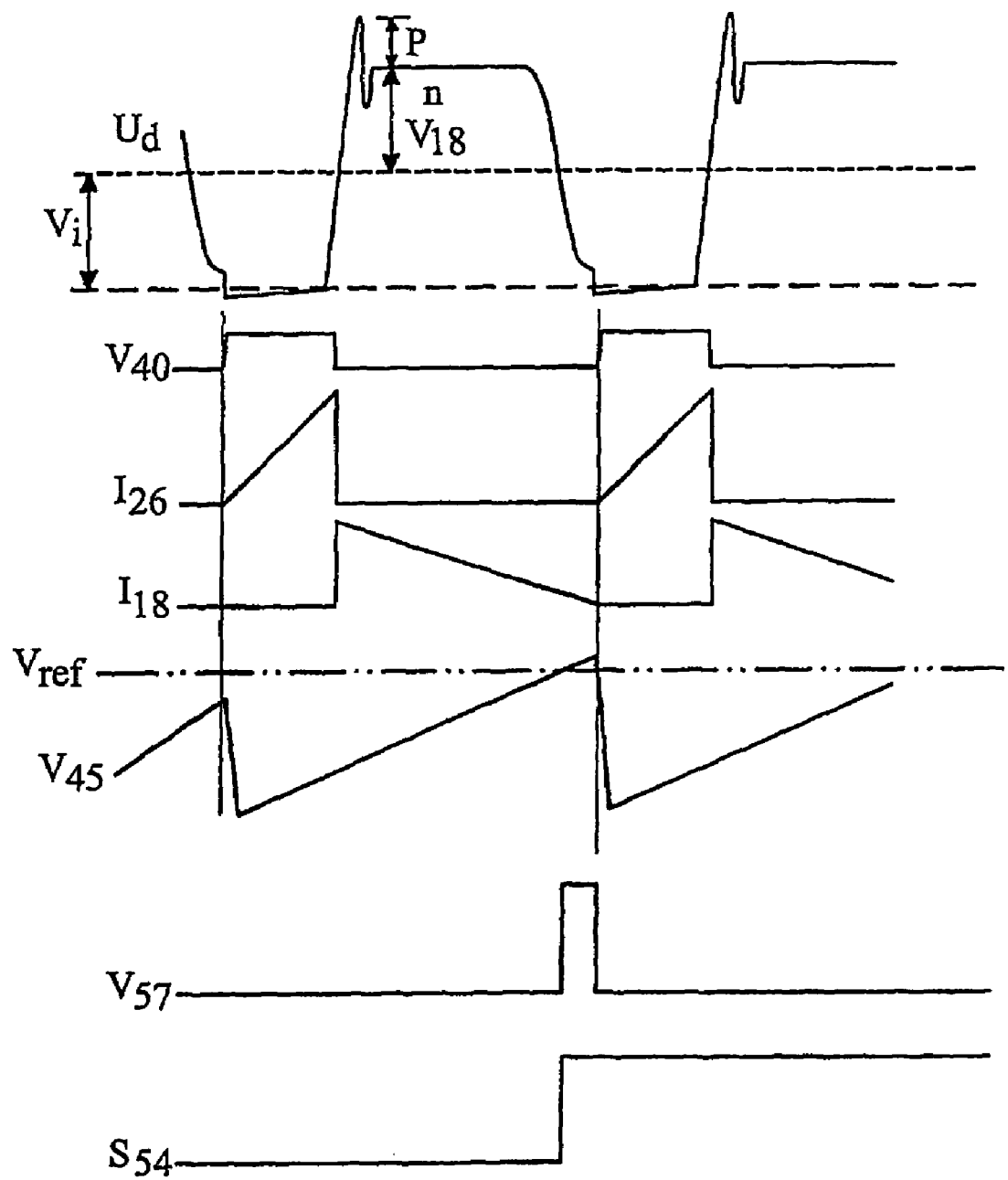
FIG. 4 is a graph showing various currents and voltages during another few cycles of operation of the converter of FIG. 1.

FIG. 3 shows different voltages and currents of the fly-back converter of FIGS. 1 and 2. At the top of FIG. 3 there is shown the variation of the voltage $U_d$ over the drain of the transistor 26 over time as well as the input voltage $V_i$. Below this voltage is shown the driving voltage pulses $V_{40}$ generated by the gate driving circuit 32 to the gate of the transistor 26 for switching it. Below the driving pulses is shown the current $I_{26}$ running through the transistor 26 and below the current through the transistor is shown the output current $I_{18}$ of the converter. Under the output current $I_{18}$ is shown a voltage $V_{45}$ supplied from the timer 45 to the second comparator 57 together with the reference voltage level $V_{ref}$. Under the voltage $V_{45}$ supplied from the timer 45 is shown an output voltage $V_{57}$ from the second comparator 57, and under this voltage $V_{57}$ another voltage $S_{54}$ supplied by the D flip-flop to the second switch 54. FIG. 4 shows the same types of currents and voltages as FIG. 3, but for higher loads, i.e. higher output currents, and when the frequency gets so low that audible noise is generated.

Under normal operation, i.e. when the frequency is above a level generating audible noise, the converter supplies an output voltage to the load in known fashion. The controlling of the first switch 26 is also done in known fashion using current control by regulating the peak current through the switch 26 and sensing when the voltage across the drain of the transistor 26 is minimal or zero. Alternatively one can sense if there is a zero crossing of the voltage across the primary winding 16 of the transformer 14 and add a delay, this mode of operation is known as a critical discontinuous or self-oscillation power supply (SOPS) mode. The peak current for which switching is to be made is set by the output voltage of the converter. From FIGS. 3 and 4 it can be seen that the frequency gets lower at higher power levels, i.e. when the converter delivers more current. Furthermore the peak current gets larger when the on time of the transistor 26 is longer, which also lowers the frequency. The secondary stroke time, i.e. the time when the current is flowing through the output stage, is dependent on the output voltage $V_{18}$. When the output voltage drops the secondary stroke time increases, so the frequency decreases. In normal operation the converter will work in a frequency region above 20 kHz. When, however, there is a large load, such as when the converter is short-circuited, at start up, overpower or when turning off the converter, audible noise can be generated, which is highly undesirable. How these low frequencies can be reduced will in the following be described more closely. A typical controller is described in the data sheet TEA1507 by Philips Semiconductors, which is hereby incorporated by reference.

As mentioned earlier the output voltage $V_{18}$ of the converter is controlled by controlling the conduction time of current in the primary winding 16, using the controller 28. This current is determined by measuring the voltage over the sense resistor 44. This voltage is fed to the gate driving circuit 32, which adjusts the conduction time of the transistor 26, typically a field effect transistor such as a BJT or a MOSFET, in response to the sensed current. In the preferred embodiment this is done through comparing the voltage across the sense resistor with the voltage from the voltage source 50 in the first comparator 52, which generates a high voltage level. The high voltage level then turns on the first switch 26. When the transistor 26 is turned off, the magnetic field in the transformer 14 collapses, and energy stored in the magnetic field is converted into a current in the secondary circuit that charges the first capacitor 22. During the primary stroke the drain source voltage $U_d$ is about 0, during the secondary stroke $U_d=V_i+nV_{18}$, where n is the ratio between primary winding 16 and secondary winding 18.

Under normal operation of the controller 28 the first switch 26 is turned on when the voltage across the drain is getting close to zero. This voltage can be provided by sensing the voltage via a sense terminal in the middle of the primary winding of the transformer. It can also be provided by a transformer having an extra sense winding, which the controller senses or by some other suitable means. The control of the switch 26 is made according to self-oscillating mode control or critical discontinuous mode control, which is well known within the art. The voltage of the voltage source does not have to be fixed, but is varied in dependence of the measured output voltage as received on the control input of the controller 28. All this is standard current control of a converter.

If the time is too long, i.e. the frequency reaches a set level, like 20 kHz at which time audible noise is generated, the timer 45 sends a signal to the gate driving circuit 32 for regulating the first switch 26. The gate driving circuit 32 then controls the first switch 26 so that the frequency again rises.

As described earlier the timer 45 of the control unit 28 monitors the frequency of the first switch 26. It does this by counting the time since the switch 26 was last switched on. If the time reaches a set time limit corresponding to a selected frequency, which in the preferred embodiment is 20 kHz, the limit for generating audible noise (i.e. the time is 50 µs), an indication is given to the gate driving circuit. This is done through the timer 45 supplying a voltage, which increases with time, to the second comparator 57. If this voltage is larger than the reference voltage $V_{ref}$, the second comparator 57 supplies a high voltage level to the D flip-flop 58. The reference voltage is here set so that the level $V_{ref}$ will be reached by the voltage from the timer when a time corresponding the period of the set frequency is reached. The D-flip-flop 58 then sets its output Q high, the next time it gets clocked. The gate driving circuit then closes the second switch 54 at the same time as the first switch 26 is turned on. This is accomplished by the fact that the output of the first comparator 52, which is driving the first switch 26, is also used as the clock signal for the D flip-flop 58, which D flip-flop 58 then clocks out the high voltage level turning on the second switch. This makes the current source 56 start loading the capacitor 48. As this is done the voltage across the capacitor 43 is added to the voltage across the sense resistor 44, which leads to the comparator 52 switching off the first switch 26 at a lower current level. As this is done the frequency of the first switch 26 is raised. When the first switch 26 is switched off the second switch 54 is kept on. The timer 45 is reset once the first switch 26 is switched on and starts counting again. If the problem with the low frequency prevails, the timer will generate another indication, which will keep the second switch 54 on. If however the frequency goes above said set level, the output of the timer 45 will not reach the voltage level $V_{ref}$ and the second comparator 57 will therefore generate a low voltage that is supplied to the D flip flop 58. The next time the D flip-flop 58 gets clocked by the turning on of the first switch 26, the Q output of the D flip-flop goes low, which turns off the second switch 54. The resistor 46 is used for unloading the capacitor 48.

With the preferred embodiment frequencies generating noise are substantially reduced. The described example was given for current control. The described preferred embodiment is a cost-effective method. The resistor 46 and capacitor 48 already exist in many systems for soft start up of the converter. This means that the invention is cheap since no extra components are needed. It is also a well-known fact that it is essential to keep the number of components in a converter at a minimum in order to keep down the costs. Since the resistor 46 and capacitor 48 are not in the controller, they can be chosen at will in order to get good operation of the invention. This gives great flexibility when deciding how fast the peak current limitation is to be done. This preferred embodiment has also been tested with good results.

Figure 5:
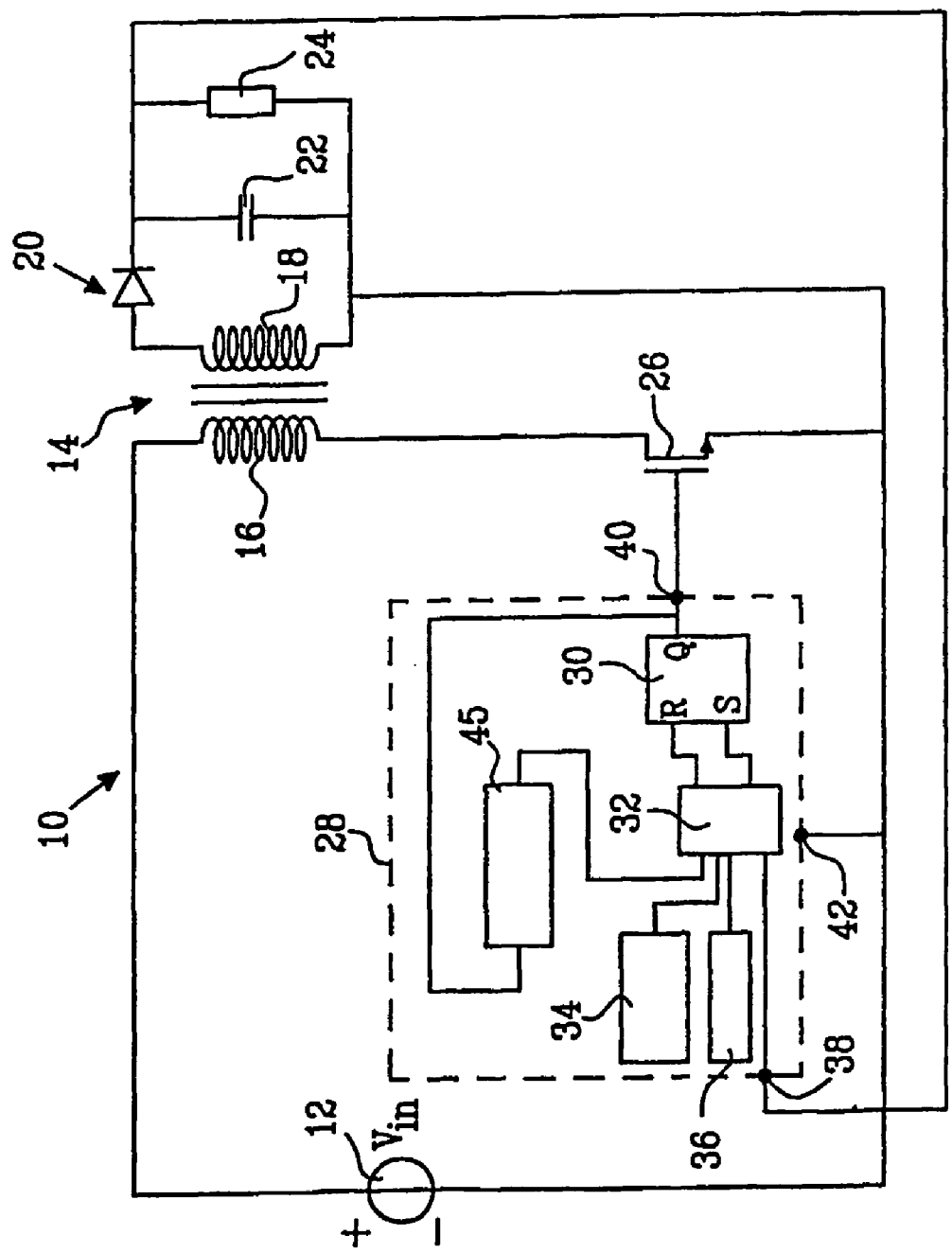
FIG. 5 shows a schematic diagram of a fly-back converter according to another embodiment of the invention.

The invention is also possible to implement using voltage control. A voltage-controlled converter is shown in FIG. 5. FIG. 5 is in many ways similar to FIG. 1. The difference is that the controller does not have a sense input 43 and that there is no sense resistor 44 or parallel circuit 46,48 in the converter of FIG. 5. The rest of the parts are identical and will not be further described here. In this case the on time of the first switch 26 is limited by direct PWM-control. Here the on time is controlled by the output voltage. Raising a voltage compared with a reference voltage can also here provide on-time limitation. Indication of low frequency can also here be provided using a comparator connected to the timer. However, current control is in many cases preferred to voltage control, since then the control is more direct and faster.

There is one instance when there can be a frequency below 20 kHz, despite the above-mentioned control of the on time of the first switch according to the present invention. The first switch 26 has a minimal on time, i.e. a smallest time it can be on. If the on time limitation set by gate driving circuit 32 is lower than this, the first switch 26 cannot go under this limit. In this case the frequency can go below the set limit. However the noise cannot be heard in this case, because then the peak currents in the system are also low.

There is an alternative embodiment of the invention and that is that the first switch 26 is directly turned on once the indication is received. Once the gate driving circuit 32 receives the indication from the timer it then immediately turns on the first switch 26. This can be implemented by suitable logic circuits given the teachings of the preferred embodiment. The converter then enters continuous conduction mode and this directly limits the frequency. There is however one problem with this embodiment and that is that the diode 20 on the output side might get hot.

In order to solve this the second embodiment of the invention can be combined with one of the previously described embodiments, i.e. that the first switch 26 is automatically switched on when the frequency goes to or under the set frequency level ad at the same time the on time of the switch is also limited by either current control or voltage control. This decreases the temperature of the diode 20.

Finally a method of controlling a converter according to the invention will be described. In the described method the method of limiting the on time of the first switch 26 by current control will be described with how the first switch 26 is regulated and then how the second switch 54 is regulated. The method is furthermore preferably implemented in form of hardware.

The method of controlling the first switch is started when the converter is turned on. Thereafter the switch is turned on. Then, there is a comparison between the added voltages, i.e. the voltages over the capacitor 48 and the sense resistor 44, with the voltage $V_{50}$. If the added voltages are above the voltage $V_{50}$, then the first switch 26 is turned off. If not the comparison is made again. It should be noted that if there is no low frequency, then the voltage of the capacitor 48 is zero and the comparison is only made between the voltage across the sense resistor 44 and $V_{50}$, which is the normal mode of operation. Thereafter, it is investigated if there exists a signal for turning on of the first switch 26. In the preferred embodiment this is indicated by the fact that a zero crossing of the voltage across the primary winding of the transformer is taking place. If there is no such indication or signal, a new investigation is made. If however there is such an indication, the switch 26 is turned on again, and the method goes on as previously described as long as the converter is turned on.

The method of controlling the second switch 54 is likewise started when the converter is turned on. Then, it is investigated if there is a rising edge of a gate-driving signal for turning the first switch 26 on. If there is such a signal the timer 45 starts working by checking the frequency, if not then the method waits for a new rising edge. Thereafter the method goes on with checking the frequency of the first switch 26. If the frequency stays above a certain set level or does not go below it, the second switch 54 is turned off if it was previously turned on, and it is again investigated if there is a rising edge of a gate driving signal. If however the frequency is below the level, which in the preferred embodiment is 20 kHz, an indication is made to that effect. Then the second switch 54 is turned on if it was not already turned on. By turning on the second switch 54 the capacitor 48 is loaded and the voltage of the capacitor 48 is added to the voltage across the sense resistor 44 for use in the comparing step of the regulation of the first switch 26. After this, investigation of a rising edge of the gate-driving signal is resumed. Thereafter the method continues as described above.

If the invention is combined with going into continuous conduction mode and turning on the first switch 26 after the indication, then the step of turning on the second switch 54 is provided with generation of a signal for turning on the first switch 26. If the invention is used only with putting the converter in continuous conduction mode, the steps of turning off and on the second switch 54 are omitted, and there is no adding of voltages in the comparing step in the regulation of the first switch 26, i.e. only the voltage across the sense resistor 44 is compared with $V_{50}$.

Preferred embodiments of this method can be summarized as follows. Method of controlling at least one first switch in a power converter comprising the steps of monitoring the switching frequency of the first switch and controlling the first switch so that the frequency stays above a certain level generating audible noise. Preferably, such a method comprises the further step of indicating when the frequency falls to said level. Preferably, the step of controlling includes turning on the first switch automatically after the indication. Preferably, the step of controlling includes limiting the on time of the first switch. Preferably, the on time is limited by direct PWM control. Preferably, the on time is limited by limiting the peak current running through the first switch. Preferably, the step of controlling includes adding a voltage to the voltage of a sense resistor through which current through the first switch is also running, and comparing the added voltages with a reference voltage for switching off the first switch. Preferably, the adding of a voltage is done by loading a capacitor with current from a current source. Preferably, the loading of current is started upon said indication.

With the present invention audible noise from the converter is thus reduced. The present invention normally works when exceptional operational circumstances exist such as over power, short circuit, start up or turning off the converter. A simple, cheap and effective way of reducing audible noise in a power converter has thus been explained. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed processor. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A control device for a switching a power converter for reducing audible noise, the power converter comprising at least one first switch (hereinafter recited as the switch) for regulating a power conversion, the control device comprising:
   means for monitoring a switching frequency of the switch to indicate when the switching frequency has dropped to a level at which audible noise is generated, and
   means for regulating switching of the switch in dependence on the monitoring means, so that to increase the switching frequency above said level in order to reduce generation of audible noise.

2. Control device according to claim 1, wherein the regulating means are arranged to directly turn on the switch when receiving an indication from the monitoring means.

3. Control device according to claim 1, wherein the regulating means are arranged to limit the on time of the switch when receiving an indication from the monitoring means.

4. Control device according to claim 3, wherein the regulating means are arranged to limit the on time by direct FWM control.

5. Control device according to claim 3, wherein the regulating means are ranged to limit the on time by limiting a peak current running through the switch.

6. Control device according to claim 5, further comprising a second switch and means for comparing a voltage corresponding to a current running through the switch with a reference voltage for turning the switch on and off, wherein the regulating means are arranged to switch on the second switch when the indication is received from the monitoring means, for adding a voltage to the voltage corresponding to the current through the switch, in order to limit the peak current running through the switch.

7. Control device according to claim 6, further comprising a current source connected to the second switch, which second switch is connectable to a capacitor, the capacitor being connectable to the comparing means and connected to the source of the switch, to which source a sense resistor for sensing the current through the switch is connected, wherein the added voltages are made up of the voltage across the capacitor and the voltage across the sense resistor.

8. Control device according to claim 6, wherein the regulating means are arranged to turn off the second switch if the monitoring means have not generated an indication the next time the switch is turned on.

9. A switching power converter, comprising:
   power conversion means,
   at least one switch for regulating the power conversion means,
   means for monitoring a switching frequency of the switch to indicate when the switching frequency has dropped to a level at which audible noise is generated, and
   means for regulating a switching of the switch in dependence on the monitoring means, so that the switching frequency is increased above said level in order to reduce generation of audible noise in the converter.

10. Method of controlling at least one switch in a power converter, the method comprising the steps of:
   monitoring a switching frequency of the switch to indicate when the switching frequency has dropped to a level at which audible noise is generated; and
   controlling the switch so that the switching frequency stays above said level at which audible noise is generated.

* * * * *